United States Patent Office 3,228,956
Patented Jan. 11, 1966

3,228,956
IMIDAZOLINE DERIVATIVES OF 2-PROPANOLS
Roger F. Monroe, Midland, Mich., assignor to The Dow Chemical Company, Midland, Mich., a corporation of Delaware
No Drawing. Filed Nov. 14, 1962, Ser. No. 237,745
5 Claims. (Cl. 260—309.6)

The invention is concerned with a new chemical compound and in a method of inhibiting the formation of emulsions and of breaking emulsions already formed employing the new compound.

The term "breaking" as used herein means demulsifying an emulsion, i.e., causing the emulsion to separate or resolve into its phases, at least to an appreciable extent. The extent to which such separation occurs will be referred to, where convenience is served, as "breakout" and expressed as the percent by volume of the emulsion or combined volumes of the components.

An emulsion may be defined as a heterogeneous mixture of two or more liquids which are normally immiscible with each other wherein relatively small droplets of one liquid (the discontinuous phase) are maintained in suspension in the other liquid (the continuous phase). Oil and water including aqueous solutions are among the more common liquid emulsions wherein either the oil or the water may be the continuous phase or the discontinuous phase. Although the preparation of emulsions is desirable, and in some industrial operations the objective, the formation of emulsions, whether as an incidental result of production operations or industrial processing or of natural causes, is often highly objectionable. Among such objectionable emulsions are those of petroleum and water or of petroleum and brine which often form in subterranean petroleum-bearing formations. Such emulsions may be the result of underground pressures and liquid movement due to natural causes or to the treatment of the formation, e.g., acidizing and fracturing, or from pressures created as a result of producing from the well. Emulsions also occur as a result of turbulence brought about during processing and transportation of petroleum and its refined or cracked fractions containing entrapped water or brine. Such emulsions, as those of petroleum and water or brine, present not only difficulties but hazards as well during the production, transportation, and processing thereof. The problems associated with production greatly curtail the amount of oil produced under conditions that are otherwise comparable. The problems associated with transportation cause resistance to flow and increased pumping costs. Problems associated with processing cause variations in pressures and create temperature and pressure control problems due to the conversion of the entrapped water to steam which is sporadically released accompanied by "bumping," i.e., more-or-less damaging vibrations of the equipment and sometimes by rupturing vessels with devastating effects.

Numerous attempts have been made to prevent and to break emulsions in subterranean formations, in storage, in service transportation lines, and in supply lines to refineries and crackers. The most successful efforts have consisted essentially of adding a small amount of a demulsifying agent (demulsifier) which lowers the surface tension of at least one of the liquids comprising the emulsion which thereby permits droplets of the discontinuous liquid phase to coalesce to form a continuous liquid phase which then either rises or settles in accordance with the relative densities of the liquids of the emulsion.

An effective demulsifier is not reliably predictable. The rather involved inter-relationship of additaments with the components of a liquid emulsion are such that the efficacy of any suggested demulsifier cannot be accurately foretold. Over the years, many additaments have been tried in efforts to inhibit and/or break emulsions. A discouraging number of these have failed because of ineffective results, impairment of desirable properties of the component liquids of the emulsion, unavailability, safety and health considerations, and the like.

There exists, accordingly, a need for a better demulsifier and for an improved method of inhibiting the formation of emulsions and, where an objectionable emulsion already exists, the breaking thereof.

It is, therefore, an object of the invention to provide a new chemical compound which is useful as a demulsifier. It is also an object of the invention to provide a method of resolving substantially immiscible liquids, which tend to form emulsions when in intimate contact with each other, into distinct liquid phases which method includes both inhibiting the formation of emulsions and demulsifying (breaking) emulsions already formed. It is a particular object to inhibit the formation of emulsions comprising petroleum, or a fraction thereof produced by cracking or fractionation, and water, brine, spent treating acid, or the like and to break an emulsion which is already formed of such liquids.

How these and related objects are attained is made clear in the ensuing description and is concisely defined in the appended claims.

The composition of the invention is the product made by reacting (1) and (2) below:

(1) the imidazoline type reaction product of (a) an alkylenepolyamine or an (hydroxyalkyl)alkylenepolyamine having from 2 to 12 carbon atoms per molecule and (b) a carboxylic acid, and (2) the mono- or diglycidyl ether of an ethylenic or an acetylenic alcohol, e.g., allyl alcohol or propargyl alcohol, respectively.

Illustrative of (a) the alkylenepolyamine to employ to prepare the imidazoline type compound of (1) above are triethylenetetramine and tetraethylenepentamine. Illustrative of the (hydroxyalkyl)alkyleneamine which alternatively may be employed in (a) of (1) above are 2-(2-aminoethylamino)ethanol and 3 - (2 - aminoethylamino)propanol.

The acid used to prepare the imidazoline type compound of (1) above may be either a saturated or unsaturated carboxylic acid, of from 1 to 26 carbon atoms, and may be of straight chain, branched, or ring configuration. Among the carboxylic acids to employ are capric, lauric, palmitic, stearic, arachidic, cerotic, Δ9-decylenic, Δ9-dodecylenic, oleic, linoleic, recinoleic, arachidonic, erucic, and mixtures thereof together with lesser amounts of other carboxylic acids. The natural oils and commercial by-product oils containing such acids may be employed, e.g., castor oil, palm oil, tung oil, linseed oil, and the acids obtained from highly refined tall oil.

Illustrative of monoglycidyl ethers of ethylenic and acetylenic alcohols to employ in step (2) above are: 1,2-epoxy - 3 - (2 - propynyloxy)propane, propargyl glycidyl ether, allyl glycidyl ether, glycidol, and ethynylcyclohexyl glycidyl ether. Illustrative of the diglycidyl ethers that may be aternatively employed in step (2) are the ethers of butene-2-diol-1,4 and butyne-2-diol-1,4.

Other carboxylic acids, alkylenepolyamines, (hydroxyl)alkylenepolyamines, and glycidyl ethers of unsaturated alcohols may be used. The generic formula for the novel compound of the invention is:

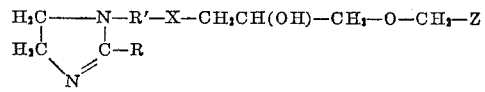

wherein R is the residue of the carboxylic acid employed and may be alkyl, alkenyl, alkadienyl, or alkatrienyl of from 1 to 25 carbon atoms; R' is selected from alkylene and alkyleneamino, i.e., —CH$_2$CH$_2$— and —CH$_2$CH$_2$NHCH$_2$CH$_2$NHCH$_2$CH$_2$— respectively; X is either O or N; and Z is either the radical CH=CH$_2$ or —C≡CH.

Illustrative of the compounds of the invention resulting from the reaction of (1) and (2) above are—

1 - {2 - [2 - (8 - heptadecenyl) - 2 - imidazolin - 1 - yl]-ethoxy}-3-(2-propynyloxy)-2-propanol having the formula:

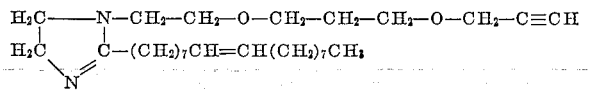

1 - {2 - [2 - (8 - heptadecenyl) - 2 - imidazolin - 1 - yl]-ethoxy}-3-(allyloxy)-2-propanol having the formula:

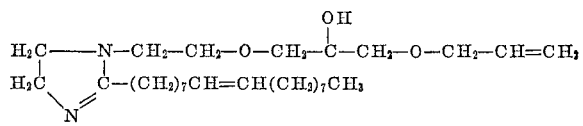

1 - {2 - [2 - octyl) - 2 - imidazolin - 1 - yl] ethoxy} - (2-propynyloxy)-2-propanol having the formula:

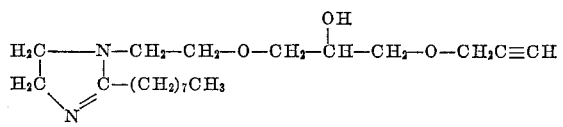

1 - (allyloxy) - 3 - {2 - [2 - (8 - heptadecenyl) - 2 - imidazolin-1-yl] ethylamino)-2-propanol having the formula:

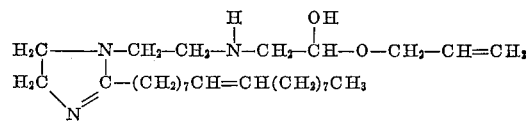

The following examples describe procedures for preparing the new compounds of the invention. Example 1 illustrates the preparation of the imidazoline reaction product by employing an alkylenepolyamine.

EXAMPLE 1

Into a three-neck, round bottom flask equipped with stirrer, thermometer, and distillation column there was placed a carboxylic acid mixture obtained by refinement of tall oil having the following analysis by weight: 57.5% oleic, 37.5% linoleic and 6% conjugated linoleic, 2.5% stearic, 1% abietic, and balance substantially palmitic and palmitoleic.

A substantially stoichiometric quantity of diethylenetriamine was then admixed with the acid mixture and the resulting admixture heated to between about 150° C. and 280° C., during which 2 moles of water are distilled off per mole of each of the polyamine and acid used. When the two moles of water have been thus removed, the reaction is complete. The product so made, remaining in the flask, is 1-(2-aminoethyl)-2-(8-heptadecenyl)-2-imidazoline.

To the thus formed product is then slowly admixed allyl glycidyl ether at a temperature between about 40° and 70° C. The product so formed was largely 1-(allyl-oxy)-3-{2-[2-(acid residue) - 2 - imidazolin-1-yl]ethylamino}-2-propanol, an embodiment of the novel compound of the invention. The acid residue will vary chemically in accordance with the compound formed with each acid present. For example, for oleic acid, the substituent would be 8-heptadecenyl.

Example 2 illustrates the preparation of the novel compound of the invention employing an (hydroxy-alkyl)-alkylenepolyamine in the preparation of the imidazoline compound.

EXAMPLE 2

282 grams of oleic acid (1 mole), 104 grams 2-(2-aminoethylamino)ethanol (1 mole), in 40 grams of naptha solvent as the reaction medium, are heated together in a suitable flask equipped with a stirrer, thermometer and distillation column. The mixture is heated, accompanied by agitation, at about 250° C. for about 8 hours during which 2 moles of water distill off. The mixture is then cooled to 50° C. and 112 grams of 1,2-epoxy-3-(2-propynyloxy)propane (1 mole) are added slowly thereto. The ensuing reaction is exothermic and cooling is provided to hold the temperature below about 80° C. The reaction mixture is then stirred for another 30 minutes and allowed to cool to room temperature.

The compound so made is 1-{2-[2-(8-heptadecenyl)-2-imidazolin-1-yl]ethoxy}-3-(2-propynyloxy) - 2-propanol in an amount of 502 grams which was 100 percent of the theoretical based on the weight of reactants employed.

The following equations represent the reactions which are thought to take place in the above example:

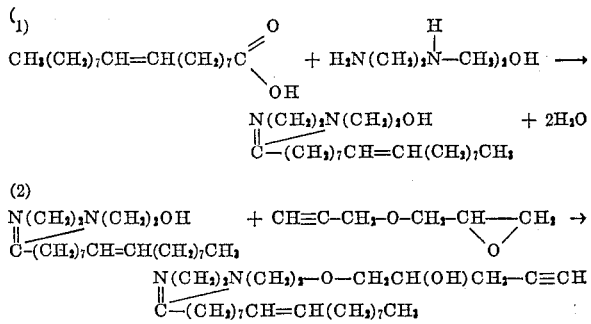

Other compounds of the invention, as hereinbefore described, may be similarly prepared according to the description set out immediately above.

For use in demulsification, the compound of the invention is employed in an amount of between about 0.01 and about 0.2 part, and preferably between about 0.02 and about 0.1 part, of the demulsifier per 100 parts by weight of the liquid being treated, regardless of whether it is one of the liquids prior to its contacting another liquid with which it tends to form an emulsion or is an emulsion already formed. Since the weight of one of the liquids is less than that of both in an emulsion already formed, it is apparent that when the emulsifier is added to one of the liquids to prevent an emulsion, less is required than when it is added to an emulsion already formed.

The following example demonstrates the efficacy of the method of the invention in inhibiting the formation of an emulsion of oil or an aqueous liquid.

EXAMPLE 3

50 parts by volume of either water or an aqueous solution such as spent acid (acid recovered from a well-acidizing job) or brine are placed in a suitable container having a volume of about 100 milliliters. The amount of demulsifier within the range stated above for the practice of the invention is added to the water or aqueous solution in the bottle. 50 parts of oil, e.g., crude petroleum, are then added to the contents of the bottle. The bottle is then capped and shaken vigorously for about 15 seconds to effect thorough mixing of the oil and aqueous liquids. The bottle is then allowed to stand for a measured period of time and the extent to which the emulsion breaks, e.g., separates into oil and aqueous phases, is observed and recorded as percent break-out by volume which is calculated by dividing the volume which separates into phases by the total volume present and multiplying by 100. For example, complete separation of the oil and aqueous phases would be recorded as 100 percent break-out.

The table below sets out results of tests conducted, as above described, on emulsions of fresh water and a crude petroleum obtained from the Mid-Continent field which is reputedly known to give severe emulsion difficulties whenever brought into intimate contact with an aqueous liquid unless precautions against the formation of an emulsion are taken. The table shows the percent breakout by volume after the shaken treated sample had stood for the period of time shown. Tests 1 to 4 are illustrative of the method of the invention employing 0.02 part by volume of the demulsifier, based on the water present. Test A contains no demulsifier and was conducted to show the apparent permanence of the emulsion in contrast to tests in accordance with the invention.

*Table*

| Test No. | Demulsifier Employed | Time of Standing in Minutes | Percent Breakout |
|---|---|---|---|
| A | None | 3,600 | 0 |
| 1 | 1-2-[2-(8-heptadecenyl)-2-imidazolin-1-yl]ethoxy-3-(2-propynyloxy)-2-propanol (prepared as in Example 2). | 30 | 90 |
| 2 | 1-2-[2-(2-octyl)-2-imidazolin-1-yl]ethoxy-3-(2-propynyloxy)-2-propanol (prepared similar to Example 2 except pelargonic acid was used instead of oleic in the preparation of the demulsifier. | 3 | 90 |
| 3 | (Same as Test 1 except a mixture of acids derived from tall oil was employed instead of oleic and in preparation of demulsifier).[1] | 30 | 84 |
| 4 | (Same as Test 1 except that red oil was used instead of chemically pure oleic acid and the monoglycidyl ether subsequently reacted therewith was 1,2-epoxy-3-(allyloxy)propane.[2] | 30 | 94 |

[1] The acid mixture here used showed the analysis by weight of that used in Example 1. The compound so formed may be represented schematically:

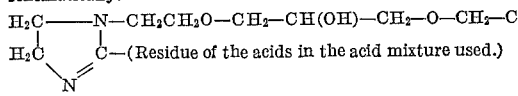

[2] Red oil is a commercially available technical grade oleic acid. The compound so formed may be represented:

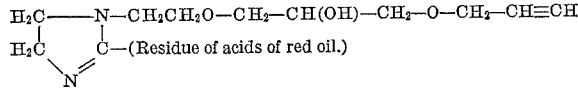

Reference to the table shows that the chemical compound of the invention is highly effective to break emulsions into distinct liquid phases even when the emulsion being treated exhibits unusual resistance to being broken by methods employing known demulsifiers. Run A shows that, in the absence of the demulsifier of the invention, the emulsion appeared to be more-or-less permanent.

Having described my invention what I claim and desire to protect by Letters Patent is:

1. The compound having the formula

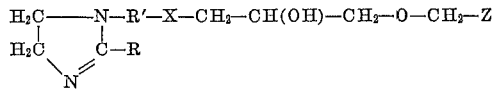

wherein R is the residue of a carboxylic acid and is selected from the class consisting of alkyl, alkenyl, alkadienyl, and alkatrienyl, which residue is one having from 1 to 25 carbon atoms, R' is a member selected from the class consisting of alkylene and alkyleneamino, which member is one having from 2 to 10 carbon atoms, X is selected from the class consisting of O and N, and Z is a radical selected from the class consisting of $-CH=CH_2$ and $-C\equiv CH$.

2. The compound: 1-{2-[2-(8-heptadecenyl)-2-imidazolin-1-yl]ethoxy}-3-(2-propynyloxy)-2-propanol.

3. The compound: 1-{2-[2-(8-heptadecenyl)-2-imidazolin-1-yl]ethoxy}-3-(allyloxy)-2-propanol.

4. The compound: 1-{2-[2-octyl)-2-imidazolin-1-yl]ethoxy}-3-(2-propynyloxy)-2-propanol.

5. The compound: 1-(allyloxy)-3-{2-[2-(8-heptadecenyl)-2-imidazolin-1-yl]ethylamino}-2-propanol.

References Cited by the Examiner

UNITED STATES PATENTS

| 2,314,022 | 3/1943 | Stone | 252—8.55 |
| 2,400,394 | 5/1946 | De Groote et al. | 252—344 |
| 2,574,537 | 11/1951 | De Groote et al. | 260—309.6 |
| 2,712,015 | 6/1955 | Bruson | 260—247.7 |
| 2,766,132 | 10/1956 | Blair et al. | 260—309.6 |
| 2,792,369 | 5/1957 | Dickson | 252—344 |
| 2,863,832 | 12/1958 | Perrine | 252—8.55 |
| 2,895,961 | 7/1959 | Hughes | 260—309.6 |
| 2,957,003 | 10/1960 | Johnson | 260—309.6 |

FOREIGN PATENTS

| 560,568 | 4/1944 | Great Britain. |
| 902,617 | 8/1962 | Great Britain. |

JOHN D. RANDOLPH, *Acting Primary Examiner.*

DUVAL T. McCUTCHEN, NICHOLAS S. RIZZO,
*Examiners.*